United States Patent
Hara et al.

(10) Patent No.: US 11,746,268 B2
(45) Date of Patent: Sep. 5, 2023

(54) SURFACE TREATMENT AGENT

(71) Applicant: DAIKIN INDUSTRIES, LTD., Osaka (JP)

(72) Inventors: Ryousuke Hara, Osaka (JP); Rumi Kawabe, Osaka (JP); Masahiro Miyahara, Osaka (JP); Ikuo Yamamoto, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 1077 days.

(21) Appl. No.: 16/473,737

(22) PCT Filed: Dec. 20, 2017

(86) PCT No.: PCT/JP2017/045682
§ 371 (c)(1),
(2) Date: Jun. 26, 2019

(87) PCT Pub. No.: WO2018/123759
PCT Pub. Date: Jul. 5, 2018

(65) Prior Publication Data
US 2021/0130668 A1    May 6, 2021

(30) Foreign Application Priority Data
Dec. 28, 2016  (JP) .................... 2016-255280

(51) Int. Cl.
| | |
|---|---|
| *C09K 3/18* | (2006.01) |
| *C08F 214/06* | (2006.01) |
| *C08F 2/24* | (2006.01) |
| *C08K 5/10* | (2006.01) |
| *C08F 220/18* | (2006.01) |
| *C08L 71/02* | (2006.01) |
| *C08L 91/08* | (2006.01) |

(52) U.S. Cl.
CPC ............... *C09K 3/18* (2013.01); *C08F 2/24* (2013.01); *C08F 214/06* (2013.01); *C08F 220/1818* (2020.02); *C08K 5/10* (2013.01); *C08L 71/02* (2013.01); *C08L 91/08* (2013.01); *C08L 2201/52* (2013.01); *C08L 2203/12* (2013.01); *C08L 2205/03* (2013.01)

(58) Field of Classification Search
CPC .... C08F 220/1818; C08F 214/06; C08F 2/24; C08L 91/08; C08L 2201/52; C08L 2203/12; C08L 2205/03; C08K 5/10; C09K 3/18
See application file for complete search history.

(56) References Cited

U.S. PATENT DOCUMENTS

| | | |
|---|---|---|
| 2004/0171736 A1 | 9/2004 | Dadalas et al. |
| 2012/0015575 A1 | 1/2012 | Fuchs et al. |
| 2015/0004351 A1 | 1/2015 | Iverson et al. |
| 2015/0204010 A1* | 7/2015 | Huang ............... D06M 15/285 252/8.62 |
| 2016/0090505 A1* | 3/2016 | Sworen .............. C08G 18/3221 427/412 |

FOREIGN PATENT DOCUMENTS

| | | |
|---|---|---|
| CN | 1753941 A | 3/2006 |
| CN | 102333915 A | 1/2012 |
| JP | 53-035811 B | 9/1978 |
| JP | 2006-328624 A | 12/2006 |
| JP | 2015-137363 A | 7/2015 |
| WO | 2015/080026 A1 | 6/2015 |

OTHER PUBLICATIONS

International Search Report of PCT/JP2017/045682 dated Mar. 6, 2018 [PCT/ISA/210].
International Preliminary Report on Patentability dated Jul. 2, 2019, in counterpart International Application No. PCT/JP2017/045682.
Communication dated Aug. 10, 2020, from the European Patent Office in counterpart application No. 17885782.7.

* cited by examiner

*Primary Examiner* — Robert D Harlan
(74) *Attorney, Agent, or Firm* — Sughrue Mion, PLLC

(57) ABSTRACT

A water- and oil-repellent agent that is an aqueous dispersion containing (A) a fluorine-free polymer having repeating units derived from a fluorine-free (meth)acrylic acid ester monomer, (B) a wax, (C) an aqueous medium, and (D) an emulsifier. The fluorine-free (meth)acrylic acid ester monomer is a compound represented by the formula $CH_2=CA^{11}-C(=O)-O-A^{12}$ where $A^{11}$ is a hydrogen atom or a methyl group and $A^{12}$ is a linear or branched $C_{18\text{-}30}$ hydrocarbon group. The emulsifier includes a sorbitan ester and another emulsifier, and the emulsifier has a hydrophilic-lipophilic balance (HLB) of 7.5 to 13.5. Also disclosed is a method of producing the water- and oil-repellent agent and a method of producing a treated substrate by applying the water- and oil-repellent agent to a substrate.

15 Claims, No Drawings

SURFACE TREATMENT AGENT

CROSS REFERENCE TO RELATED APPLICATIONS

This application is a National Stage of International Application No. PCT/JP2017/045682, filed Dec. 20, 2017, claiming priority to Japanese Patent Application No. 2016-255280, filed Dec. 28, 2016.

TECHNICAL FIELD

The present invention relates to a fluorine-free polymer and a surface treatment agent comprising a polymer surfactant. The present invention can imparts excellent water repellency and antifouling property to a textile (for example, a carpet), a paper, a non-woven fabric, masonry, an electrostatic filter, a dust protective mask, and a part of fuel cell.

BACKGROUND ART

Conventionally, fluorine-containing water- and oil-repellent agents comprising fluorine compounds are known. The water- and oil-repellent agents show good water- and oil-repellency, when substrates such as textiles are treated with the water- and oil-repellent agents.

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), one of long-chain fluoroalkyl compounds, is proved to have a danger to burden the environment. Under such a situation, EPA (United States Environmental Protection Agency) announced on Apr. 14, 2003 that the scientific investigation on PFOA should be more intensively executed.

On the other hand, Federal Register (FR Vol. 68, No. 73/Apr. 16, 2003[FRL-2303-8]) (http://www.epa.gov/opptintr/pfoa/pfoafr.pdf), EPA Environmental News for release Monday Apr. 14, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA (herein, the telomer means a long-chain fluoroalkyl group). It is also announced that the "telomer" is used in a large number of commercial products including fire fighting foams, care products and cleaning products as well as soil, stain and grease resistant coating on carpets, textiles, paper, and leather having the imparted water- and oil-repellency and antifouling property. There is the concern that the fluorine-containing compound is accumulated in environment.

In order to reveal water- and oil-repellency, after the fluorine-containing water- and oil-repellent agent is adhered to substrates such as textiles, the substrate must be heat-treated at a high temperature (for example, 100° C. or more). High energy is needed for the heat treatment at a high temperature.

Furthermore, the fluorine-containing polymer is expensive.

Therefore, it may be desirable not to use the fluorine-containing polymer or to reduce the amount of the fluorine-containing polymer.

JP 2006-328624A discloses a water-repellent agent comprising a fluorine-free polymer which comprises an acrylate ester having at least 12 carbon atoms in an ester portion as a monomeric unit, wherein a constitution rate of the acrylate ester is 80 to 100% by mass, based on the whole quantity of the monomeric units constituting the fluorine-free polymer.

JP 2015-137363B discloses a fluorine-free water-repellent agent prepared by a preparation method comprising the steps of (A) obtaining a mixture containing a wax, an unsaturated monomer, a solvent, water and an emulsifier, and (B) adding an initiator to the mixture and reacting the mixture to obtain the fluorine-free water-repellent agent.

However, these water-repellent agents are inferior in water repellency.

JP S53-35811B discloses a composition comprising a paraffin emulsion formed by emulsifying (a) a paraffin hydrocarbon and (b) an oxidized paraffin, in the presence of (c) an alkaline alkali metal compound, and (d) a polymer emulsion. However, this composition is inferior in water repellency, because a soap is generated. In addition, the polymer emulsion does not provide sufficient water repellency, because the carbon number of the ester portion is low.

PRIOR ARTS DOCUMENTS

Patent Documents

Patent Document 1: JP 2006-328624A
Patent Document 2: JP 2015-137363B
Patent Document 3: JP S53-35811B

SUMMARY OF INVENTION

Problems to be Solved by the Invention

One of objects of the present invention is to provide a surface treatment agent (a water- and oil-repellent agent, particularly a water-repellent agent) having improved processing stability of water- and oil-repellent treatment of, for example, fibers, such as a gum-up property.

Another object of the present invention is to provide a surface treatment agent excellent in a chemical stability (a contamination stability) and a mechanical stability.

A further object of the present invention is to provide a surface treatment agent having excellent water- and oil-repellency.

Means for Solving the Problems

The present invention provides a water- and oil-repellent agent comprising:
(A) a fluorine-free polymer having a repeating unit derived from a fluorine-free (meth)acrylate ester monomer,
(B) a wax,
(C) an aqueous medium, and
(D) an emulsifier,
wherein the fluorine-free (meth)acrylate ester monomer is a compound of the formula:

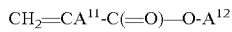

wherein $A^{11}$ is a hydrogen atom or a methyl group, and $A^{12}$ is a linear or branched hydrocarbon group having 18-30 carbon atoms, and the emulsifier comprises a sorbitan ester.

The invention further provides a method of producing a water- and oil-repellent agent comprising the steps of:
(i) polymerizing a monomer comprising a fluorine-free (meth)acrylate ester monomer in the presence of an emulsifier for polymer and an aqueous medium, to obtain an aqueous dispersion of a fluorine-free polymer having a repeating unit derived from the fluorine-free (meth)acrylate ester monomer, (ii) dispersing a wax in water in the presence of an emulsifier for wax to obtain an aqueous dispersion of the wax, and (iii) mixing the aqueous dispersion of the fluorine-free polymer with the aqueous dispersion of the wax.

Effects of the Invention

In the surface treatment agent (the water- and oil-repellent agent) of the present invention, sedimentation of particles does not occur, and the polymer does not adhere to a roll to cause a fabric staining.

The present invention can provide excellent water repellency, antifouling property and soil releasability, for example, excellent durability of water repellency.

Furthermore, a chalking property and feeling are good.

The surface treatment agent of the present invention can be used as a water-repellent agent or an antifouling agent.

MODES FOR CARRYING OUT THE INVENTION

The water- and oil-repellent agent is generally an aqueous emulsion of the fluorine-free polymer.

The water- and oil-repellent agent comprises:
(A) a fluorine-free polymer having a repeating unit derived from a fluorine-free (meth)acrylate ester monomer,
(B) a wax,
(C) an aqueous medium, and
(D) an emulsifier.

In the present invention, the fluorine-free (meth)acrylate ester monomer is a compound of the formula:

$$CH_2=CA^{11}-C(=O)-O-A^{12}$$

wherein $A^{11}$ is a hydrogen atom or a methyl group, and $A^{12}$ is a linear or branched hydrocarbon group having 18-30 carbon atoms.

In the present invention, particularly preferably, the emulsifier comprises the sorbitan ester and another emulsifier. Particularly preferably, the hydrophilic-lipophilic balance (HLB) of the emulsifier (nonionic surfactant) in the water- and oil-repellent agent is 7.5 to 13.5.

In the water- and oil-repellent agent, a weight ratio of the fluorine-free polymer to the wax may be 30/70 to 95/5, for example, 40/80 to 90/10.

Preferably, in the present invention, the aqueous dispersion comprising the fluorine-free polymer and the wax can be prepared by the steps of:

(i) polymerizing a monomer comprising a fluorine-free (meth)acrylate ester monomer in the presence of an emulsifier for polymer and an aqueous medium, to obtain an aqueous dispersion of a fluorine-free polymer having a repeating unit derived from the fluorine-free (meth)acrylate ester monomer, (ii) dispersing a wax in water in the presence of an emulsifier for wax to obtain an aqueous dispersion of the wax, and (iii) mixing the aqueous dispersion of the fluorine-free polymer with the aqueous dispersion of the wax. An additional emulsifier and/or aqueous medium may be added after the mixing step.

Accordingly, the water- and oil-repellent agent of the present invention may comprise:

(1) an aqueous dispersion of the fluorine-free polymer comprising the emulsifier for polymer and the aqueous medium, and (2) an aqueous dispersion of the wax comprising the wax and the emulsifier for wax.

The water- and oil-repellent agent may contain a component, such as an additive, other than the fluorine-free polymer (A), the wax (B), the aqueous medium (C) and the emulsifier (D). The water- and oil-repellent agent may consist of these components (A) to (D) (and the additive). Preferably, the water- and oil-repellent agent does not contain a fluorine-containing polymer.

(A) Fluorine-Free Polymer

The Fluorine-free polymers do not contain a fluorine atom. The fluorine-free polymer does not comprise a fluorine-containing monomer, for example, a fluorine-containing monomer having a fluoroalkyl group. The fluorine-free polymer is a polymer having a repeating unit derived from the fluorine-free (meth)acrylate ester monomer.

In the present invention, the fluorine-free polymer (A) may consist of (A1) a repeating unit derived from the fluorine-free (meth)acrylate ester monomer, but the fluorine-free polymer (A) may comprise one of both of (A2) a repeating unit derived from a fluorine-free non-crosslinkable monomer and (A3) a repeating unit derived from a fluorine-free crosslinkable monomer, in addition to the repeating unit (A1).

(A1) Fluorine-Free (Meth)Acrylate Ester Monomer

The fluorine-free (meth)acrylate ester monomer is a compound represented by the formula:

$$CH_2=CA^{11}-C(=O)-O-A^{12}$$

wherein $A^{11}$ is a hydrogen atom or a methyl group, and $A^{12}$ is a linear or branched hydrocarbon group having 18-30 carbon atoms.

The fluorine-free (meth)acrylate ester monomer does not contain a fluoroalkyl group. Although the fluorine-free (meth)acrylate ester monomer may contain a fluorine atom, the fluorine-free (meth)acrylate ester monomer is preferably free from a fluorine atom.

$A^{11}$ is preferably a hydrogen atom.

$A^{12}$ is a linear or branched hydrocarbon group. Particularly, the linear or branched hydrocarbon group may be a linear hydrocarbon group. The number of carbon atoms in the linear or branched hydrocarbon group is 18 to 30. The linear or branched hydrocarbon group preferably has 18-28 carbon atoms, particularly 18 or 22 carbon atoms. Generally, the linear or branched hydrocarbon group is preferably a saturated aliphatic hydrocarbon group, particularly an alkyl group.

Preferable examples of the fluorine-free (meth)acrylate ester monomer are stearyl (meth)acrylate and behenyl (meth)acrylate. Stearyl (meth)acrylate is particularly preferable.

The presence of the fluorine-free (meth)acrylate ester monomer increases water repellency, oil repellency and feeling imparted by the fluorine-free polymer.

(A2) Fluorine-Free Non-Crosslinkable Monomer

The fluorine-free non-crosslinkable monomer (A2) is a monomer other than the fluorine-free (meth)acrylate ester monomer (A1). The fluorine-free non-crosslinkable monomer (A2) is a monomer which does not contain a fluorine atom. The fluorine-free non-crosslinkable monomer (A2) does not have a crosslinkable functional group. Unlike the crosslinkable monomer (A3), the fluorine-free non-crosslinkable monomer (A2) has no crosslinkability. Preferably, the fluorine-free non-crosslinkable monomer (A2) is a fluorine-free monomer having an ethylenically unsaturated double bond. The fluorine-free non-crosslinkable monomer (A2) is preferably a vinyl monomer free from fluorine. Generally, the fluorine-free non-crosslinkable monomer (A2) is a compound having one ethylenically unsaturated double bond.

The preferable fluorine-free non-crosslinkable monomer (A2) is a compound of the formula:

$$CH_2\!=\!CA\text{-}T$$

wherein A is a hydrogen atom, a methyl group, or a halogen atom other than a fluorine atom (for example, a chlorine atom, a bromine atom, and an iodine atom), and
T is a hydrogen atom, an open-chained or cyclic hydrocarbon group having 1-30 carbon atoms, or an open-chained or cyclic organic group having 1-31 carbon atoms and an ester bond.

Examples of the open-chain or cyclic hydrocarbon group having 1-30 carbon atoms are a linear or branched aliphatic hydrocarbon group having 1-30 carbon atoms, a cycloaliphatic group having 4-30 carbon atoms, an aromatic hydrocarbon group having 6-30 carbon atoms, and an araliphatic hydrocarbon group having 7-30 carbon atoms.

Examples of the open-chain or cyclic organic group having 1-31 carbon atoms and an ester bond are: —C(=O)—O-Q and —O—C(=O)-Q wherein Q is a linear or branched aliphatic hydrocarbon group having 1-30 carbon atoms, a cycloaliphatic group having 4-30 carbon atoms, an aromatic hydrocarbon group having 6-30 carbon atoms, or an araliphatic hydrocarbon group having 7-30 carbon atoms.

Preferable examples of the fluorine-free non-crosslinkable monomer (A2) are, for example, ethylene, vinyl acetate, acrylonitrile, styrene, poly(ethyleneglycol) (meth)acrylate, polypropyleneglycol (meth)acrylate, methoxypolyethyleneglycol (meth)acrylate, methoxypolypropyleneglycol (meth)acrylate, and vinyl alkyl ether. The fluorine-free non-crosslinkable monomer (A2) is not limited to these examples.

The fluorine-free non-crosslinkable monomer (A2) may be a (meth)acrylate ester having an alkyl group. The number of the carbon atoms in the alkyl group may be 1 to 17. For example, the fluorine-free non-crosslinkable monomer (A2) may be acrylates of the general formula:

$$CH_2\!=\!CA^1COOA^2$$

wherein $A^1$ is a hydrogen atom, a methyl group, or a halogen atom other than a fluorine atom (for example, a chlorine atom, a bromine atom, and an iodine atom), and
$A^2$ is an alkyl group represented by $C_nH_{2n+1}$ (n=1-17).

The fluorine-free polymer may not comprise a repeating unit derived from the (meth)acrylate ester having an alkyl group having 1 to 17 carbon atoms.

The fluorine-free non-crosslinkable monomer (A2) may be a (meth)acrylate monomer having a cyclic hydrocarbon group. The (meth)acrylate monomer having a cyclic hydrocarbon group is a compound having (preferably monovalent) cyclic hydrocarbon group and monovalent (meth)acrylate group. The monovalent cyclic hydrocarbon group directly bonds to the monovalent (meth)acrylate group. Examples of the cyclic hydrocarbon group include a saturated or unsaturated, monocyclic, group, polycyclic group or bridged ring group. The cyclic hydrocarbon group is preferably a saturated group. The cyclic hydrocarbon group preferably has from 4 to 20 carbon atoms. Examples of the cyclic hydrocarbon group include a cycloaliphatic group having 4 to 20 carbon atoms, particularly 5 to 12 carbon atoms, an aromatic group having 6 to 20 carbon atoms, and an araliphatic group having 7 to 20 carbon atoms. The number of carbon atoms in the cyclic hydrocarbon group is particularly preferably at most 15, for example, at most 10. A carbon atom in the cyclic hydrocarbon group preferably directly bonds to an ester group in the (meth)acrylate group. The cyclic hydrocarbon group is preferably a saturated cycloaliphatic group.

Specific examples of the cyclic hydrocarbon group include a cyclohexyl group, a t-butyl cyclohexyl group, an isobornyl group, a dicyclopentanyl group, a dicyclopentenyl group and adamantyl group. The (meth)acrylate group is an acrylate group or a methacrylate group, preferably a methacrylate group. Specific examples of the monomer having cyclic hydrocarbon group include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl(meth)acrylate, tricyclopentanyl (meth)acrylate, adamantyl (meth)acrylate, 2-methyl-2-adamantyl (meth)acrylate and 2-ethyl-2-adamantyl (meth)acrylate.

The fluorine-free non-crosslinkable monomer (A2) may be a halogenated olefin. The halogenated olefin monomer may be a halogenated olefin having 2-20 carbon atoms and substituted by 1-10 chlorine atoms, bromine atoms or iodine atoms. Preferably, the halogenated olefin is a chlorinated olefin having 2-20 carbon atoms, particularly an olefin having 2-5 carbon atoms and having 1-5 chlorine atoms. Preferable examples of the halogenated olefin are a vinyl halide such as vinyl chloride, vinyl bromide and vinyl iodide, and a vinylidene halide such as vinylidene chloride, vinylidene bromide and vinylidene iodide.

(A3) Fluorine-Free Crosslinkable Monomer

The fluorine-free polymer may have a repeating unit derived from the fluorine-free crosslinkable monomer (A3). The fluorine-free crosslinkable monomer (A3) is a monomer which does not contain a fluorine atom. The fluorine-free crosslinkable monomer (A3) may be a compound free from fluorine, having at least two reactive groups and/or ethylenically unsaturated double bonds. The fluorine-free crosslinkable monomer (A3) may be a compound which has at least two ethylenically unsaturated double bonds or a compound which has at least one ethylenically unsaturated double bond and at least one reactive group. Examples of the reactive group include a hydroxyl group, an epoxy group, a chloromethyl group, a blocked isocyanate group, an amino group and a carboxyl group.

Examples of the fluorine-free crosslinkable monomer (A3) include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate, to which the crosslinkable monomer is not limited.

When the fluorine-free non-crosslinkable monomer (A2) and/or the fluorine-free crosslinkable monomer (A3) are copolymerized, various properties such as water- and oil-repellency, antifouling property, cleaning durability and washing durability of said properties, solubility in solvents, hardness and feeling may be improved depending on the necessity.

Generally, a number-average molecular weight (Mn) of the fluorine-free polymer may be 1,000-1,000,000, for example, 2,000-500,000, particularly 3,000-200,000. Generally, the number-average molecular weight (Mn) of the fluorine-free polymer is measured by GPC (gel permeation chromatography).

The amount of fluorine-free polymer may be 0.1 to 50% by weight, for example, 1 to 30% by weight, based on the water- and oil-repellent agent.

(B) Wax

Examples of the wax include a paraffin wax, a microcrystalline wax, a Fischer-Tropsch wax, a polyethylene wax, an animal and vegetable wax, and a mineral wax. The paraffin wax is preferable. Specific examples of a compound constituting the wax are normal alkanes (e.g., tricosane, tetracosane, pentacosane, hexacosane, heptacosane, octacosane, nonacosane, triacontane, hentriacontane, dotriacontane, tritriacontane, tetratriacontane, pentatriacontane and hexatriacontane), normal alkenes (e.g., 1-eicosene, 1-docosene, 1-tricocene, 1-tetracocene, 1-pentacocene, 1-hexacosene, 1-heptacosene, 1-octacosene, nonacosane, triacontane, hentriacontane, dotriacontane, tritriacontane, tetratriacontane, pentatriacontane and hexatriacontane). The carbon number of the compound constituting the wax is preferably 20 to 60, for example, 25 to 45. The molecular weight of the wax is preferably 300 to 700.

A melting point of the wax may be 52 to 88° C., preferably 55 to 85° C., more preferably 60 to 80° C., particularly preferably 65 to 78° C.

A needle penetration (a penetration) of the wax is preferably 20 or less, more preferably 15 or less, particularly preferably 10 or less. The lower limit of the needle penetration of the wax may be 0.1, for example, 1.

The melting point and the needle penetration of the wax can be measured in accordance with JIS K 2235-1991.

The amount of the wax (B) is preferably 1 to 200 parts by weight or 5 to 150 parts by weight, based on 100 parts by weight of the fluorine-free polymer (A). Alternatively, in the water- and oil-repellent agent, a weight ratio of the fluorine-free polymer (A) to the wax (B) may be 30/70 to 95/5, for example, 40/80 to 90/10.

An aqueous dispersion of the wax can be prepared by dispersing the wax in water in the presence of an emulsifier for wax. The preparation of the aqueous dispersion of wax is preferably carried out by mixing the wax, water and the emulsifier for wax at a high temperature (e.g., 60 to 90° C.). The mixing time may be, for example, 10 seconds to 10 hours. Preferably, the mixing is carried out by using a homomixer.

(C) Aqueous Medium

The aqueous medium may be water alone, or a mixture of water and an (water-soluble) organic solvent. The amount of the organic solvent may be at most 30% by weight (preferably at least 0.1%), for example, at most 10% by weight, based on the aqueous medium. The aqueous medium is preferably water alone.

The amount of the aqueous medium may be, for example, 30 to 99% by weight, particularly 50 to 90% by weight, based on the water- and oil-repellent agent.

(D) Emulsifier

The emulsifier comprises the sorbitan ester. The emulsifier is a combination of the sorbitan ester with another emulsifier. It is particularly preferred that the other emulsifier is a polyether compound having a polyoxyalkylene group.

The hydrophilic-lipophilic balance of the nonionic emulsifier in the water- and oil-repellent agent (particularly, an average HLB of the emulsifiers in the aqueous dispersion of the polymer and the aqueous dispersion of the wax) is 7.5 to 13.5. The lower limit of the HLB of the nonionic emulsifier in the water- and oil-repellent agent may be 7.8, for example, 8.0. The upper limit of the HLB of the nonionic emulsifier in the water- and oil-repellent agent may be 13, for example, 12.5, particularly 12.

In the present invention, the emulsifier is used to disperse the fluorine-free polymer and the wax in the aqueous medium. It is possible to mix the fluorine-free polymer (or the aqueous dispersion comprising the fluorine-free polymer and the emulsifier) with the wax, or to mix the fluorine-free polymer with the wax (or the aqueous dispersion comprising the wax and the emulsifier). However, it is preferable to separately prepare the aqueous dispersion of fluorine-free polymer comprising the fluorine-free polymer and the emulsifier, and the aqueous dispersion of wax comprising the wax and the emulsifier, and to then mix these aqueous dispersions. After the mixing, an emulsifier and/or an aqueous medium may be added, if necessary.

Generally, the emulsifier for polymer is used to disperse the fluorine-free polymer in the aqueous medium. It is preferable to polymerize the monomer in the presence of the emulsifier for polymer.

Generally, the emulsifier for wax is used to disperse the wax in the aqueous medium.

In the present invention, the emulsifier (the emulsifier for polymer and the emulsifier for wax) is at least one selected from a nonionic surfactant, a cationic surfactant, an anionic surfactant and an amphoteric surfactant. The emulsifier is preferably the nonionic surfactant alone or a combination of the nonionic surfactant and the cationic surfactant. In the combination of the nonionic surfactant and the cationic surfactant, a weight ratio of the nonionic surfactant to the cationic surfactant is 99.5:0.5 to 50:50, for example, 99:1 to 90:10.

The emulsifier for polymer and the emulsifier for wax may be nonionic surfactant alone or a combination of the nonionic surfactant and the cationic surfactant. One or both of the emulsifier for polymer and the emulsifier for wax comprise the sorbitan ester which is the nonionic surfactant. It is preferable that the emulsifier for wax and the emulsifier for polymer are the nonionic surfactant. It is particularly preferable that each of the emulsifier for wax and the emulsifier for polymer is a combination of the sorbitan ester with another emulsifier (particularly, a polyether compound having a polyoxyalkylene group). The hydrophilic-lipophilic balance of the emulsifier for polymer may be 4 to 16, for example, 6 to 15, particularly 8 to 14, especially 8.5 to 13. The hydrophilic-lipophilic balance of the emulsifier for wax may be 4 to 15, for example, 6 to 14, particularly 7 to 13.5, especially 8 to 12.5. An additional emulsifier which may be added after the step of mixing the aqueous dispersion of the fluorine-free polymer with the aqueous dispersion of the wax may be a nonionic surfactant or a cationic surfactant, preferably a nonionic surfactant.

As used herein, the hydrophilic-lipophilic balance (HLB) is a value obtained from the following equation by the Griffin method, $$HLB = 20 \times [(\text{molecular weight of hydrophilic group contained in surfactant})/(\text{molecular weight of surfactant})];$$

a value described in Document 1 (Surfactant Handbook, 3rd Edition, May 1, 1998); or
a value described in Document 2 (The HLB SYSTEM, 1989.7 ICI Americas Inc).

The HLB value is determined by the Griffin method for a specific surfactant. When the value cannot be calculated by the Griffin method, the numerical value described in Document 1 (or Document 2) is adopted. If the value of HLB is not described in Document 1, the value described in Document 2 is adopted.

In a mixture system containing at least two types of emulsifiers, the HLB of the mixture system can be calculated by a weighted average of the HLB of each single emulsifier.
(D1) Sorbitan Ester The sorbitan ester is a nonionic surfactant.

The sorbitan ester is an ester of carboxylic acid (Number of carbon atoms: 1-30, preferably 7-19) with sorbitan (alcohol). The number of moles of carboxylic acid in the sorbitan ester is 1, 2 or 3. A monocarboxylic acid ester is preferable.

In an alkylene oxide adduct of the sorbitan ester (addition of at least 1 mole, for example, 2 to 100 moles of an alkylene oxide per 1 mole of the ester), the alkylene oxide is preferably ethylene oxide or propylene oxide. In the alkylene oxide adduct, the molar number of addition of the alkylene oxide may be 1 to 50, particularly 1 to 30.

The sorbitan ester and the alkylene oxide adduct of sorbitan ester are referred to as a sorbitan ester compound.

The sorbitan ester compound may be a surfactant of the formula:

Formula (11)

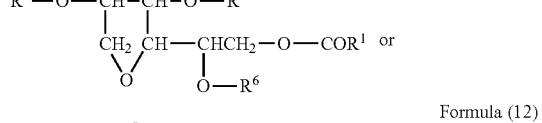
Formula (12)

wherein $R^1$ is an alkyl group having 1 to 22 carbon atoms or an alkenyl group having 2 to 22 carbon atoms, and
$R^4$, $R^5$ and $R^6$ are H, $R^1CO-$, $-(CH_2CH_2O)_p-(R^2O)_q-R^3$ (in which $R^2$ is an alkylene group having at least 3 carbon atoms, $R^3$ is a hydrogen atom, an alkyl group having 1 to 22 carbon atoms or an alkenyl group having 2 to 22 carbon atoms, p is a number of at least 2, and q is a number of 0 or at least 1).

Specific examples of the nonionic surfactant represented by the formula (11) or (12) include sorbitan monolaurate, sorbitan monostearate, sorbitan monopalmitate, sorbitan monooleate, sorbitan sesquistearate, sorbitan tristearate, polyoxyethylene sorbitan monolaurate, polyoxyethylene sorbitan monopalmitate, polyoxyethylene sorbitan monostearate, polyoxyethylene sorbitan monooleate, and polyoxyethylene sorbitan tristearate.
(D2) Nonionic Surfactant (Another Nonionic Surfactant Other than the Sorbitan Ester Compound)

Examples of nonionic surfactants include an ether, an ester, an ester ether, an alkanolamide, a polyhydric alcohol and an amine oxide.

An example of the ether is a compound having an oxyalkylene group (generally, a polyoxyalkylene group, preferably a polyoxyethylene group).

An example of the ester is an ester of an alcohol with a fatty acid. Examples of the alcohol include a monohydric to hexahydric (particularly dihydric to pentahydric) $C_1$-$C_{50}$ (particularly $C_3$-$C_{30}$) alcohol (e.g., aliphatic alcohol). An example of fatty acid is a saturated or unsaturated fatty acid having 2 to 50 carbon atoms, particularly 5 to 30 carbon atoms.

An example of ester ether is a compound obtained by adding an alkylene oxide (particularly ethylene oxide) to an ester of an alcohol with a fatty acid (at 1 or more mole, for example, 2 to 100 moles of the alkylene oxide per 1 mole of the ester). Examples of the alcohol is a monohydric to hexahydric (particularly dihydric to pentahydric) alcohol (for example, an aliphatic alcohol) having 1 to 50 carbon atoms (particularly 3 to 30 carbon atoms). An example of the fatty acid is a saturated or unsaturated fatty acid having 2 to 50 carbon atoms, particularly 5 to 30 carbon atoms.

An example of the alkanolamide is a compound formed from a fatty acid and an alkanolamine. The alkanolamide may be a monoalkanol amide or a dialkanol amide. An example of the fatty acid is a saturated or unsaturated fatty acid having 2 to 50 carbon atoms, particularly 5 to 30 carbon atoms. The alkanolamine may be an alkanol having 2-50, particularly 5-30 carbon atoms which has 1-3 amino groups and 1-5 hydroxyl groups.

The polyhydric alcohol may be a compound (for example, an ester) containing a dihydric to pentahydric alcohol having 3-30 carbon atoms.

The amine oxide may be an oxide (for example, having 5-50 carbon atoms) of an amine (a secondary amine or preferably a tertiary amine)

Preferably, the nonionic surfactant is a nonionic surfactant having an oxyalkylene group (generally a polyoxyalkylene group, preferably a polyoxyethylene group). Preferably, the carbon number of an alkylene group in the oxyalkylene group is from 2 to 10 carbon atoms. Preferably, the number of the oxyalkylene groups in a molecule of the nonionic surfactant is generally from 2 to 100.

Preferably, the nonionic surfactant is a nonionic surfactant having an oxyalkylene group which is selected from the group consisting of the ether, the ester, the ester ether, the alkanolamide, the polyhydric alcohol and the amine oxide.

The nonionic surfactant may be a polyether compound (a polyether compound having a polyoxyalkylene group) represented by the formula:

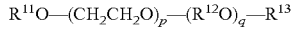

wherein $R^{11}$ is an alkyl group having 1-22 carbon atoms, or an alkenyl group or an acyl group having 2-22 carbon atoms, $R^{12}$ each is independently, the same or different, an alkylene group having at least 3 (for example, 3-10) carbon atoms, $R^{13}$ is a hydrogen atom, an alkyl group having 1-22 carbon atoms, or an alkenyl group having 2-22 carbon atoms,
p is a number of at least 2, and
q is a number of 0 or at least 1.

The carbon number of the $R^{11}$ is preferably from 8 to 20, particularly from 10 to 18. Preferable examples of $R^{11}$ include a lauryl group, a tridecyl group and an oleyl group.

Examples of $R^{12}$ are a propylene group and a butylene group.

In the polyether compound, p may be a number of at least 3 (for example, 5-200). q may be a number of at least 2 (for example, from 5 to 200). That is, $-(R^{12}O)_q-$ may form a polyoxyalkylene chain.

The polyether compound may be a polyoxyethylene alkylene alkyl ether containing a hydrophilic polyoxyethylene chain in center, and a hydrophobic oxyalkylene chain (particularly a polyoxyalkylene chain). The hydrophobic oxyalkylene chain includes an oxypropylene chain, an oxybutylene chain and a styrene chain. Particularly, the oxypropylene chain is preferable.

Preferable nonionic surfactant is a polyoxyethylene compound represented by the formula:

$$R^{11}O-(CH_2CH_2O)_p-H$$

wherein $R^{11}$ and p are the same as defined above.

Specific examples of the nonionic surfactant include:

$$C_{10}H_{21}O-(CH_2CH_2O)_p-(C_3H_6O)_q-H$$

$$C_{12}H_{25}O-(CH_2CH_2O)_p-(C_3H_6O)_q-H$$

$$C_{16}H_{31}O-(CH_2CH_2O)_p-(C_3H_6O)_q-H$$

$$C_{16}H_{33}O-(CH_2CH_2O)_p-(C_3H_6O)_q-H$$

$$C_{18}H_{35}O-(CH_2CH_2O)_p-(C_3H_6O)_q-H$$

$$C_{18}H_{37}O-(CH_2CH_2O)_p-(C_3H_6O)_q-H$$

$$C_{12}H_{25}O-(CH_2CH_2O)_p-(C_3H_6O)_q-C_{12}H_{25}$$

$$C_{16}H_{31}O-(CH_2CH_2O)_p-(C_3H_6O)_q-C_{16}H_{31}$$

$$C_{16}H_{33}O-(CH_2CH_2O)_p-(C_3H_6O)_q-C_{12}H_{25}$$

$$\text{iso-}C_{13}H_{27}O-(CH_2CH_2O)_p-(C_3H_6O)_q-H$$

$$C_{10}H_{21}COO-(CH_2CH_2O)_p-(C_3H_6O)_q-H$$

$$C_{16}H_{33}COO-(CH_2CH_2O)_p-(C_3H_6O)_q-C_{12}H_{25}$$

wherein p and q are the same as defined above.

Examples of the nonionic surfactant include a condensation product of ethylene oxide with hexylphenol, isooctatylphenol, hexadecanol, oleic acid, an alkane ($C_{12}$-$C_{16}$) thiol, a sorbitan ester (sorbitan mono-fatty acid ($C_7$-$C_{19}$)) or an alkyl ($C_{12}$-$C_{18}$) amine.

The nonionic surfactant may be an ester of an alcohol (preferably having 3 to 30 carbon atoms) with a fatty acid (preferably having 5 to 30 carbon atoms), or an alkylene oxide adduct of said ester.

The nonionic surfactant may be used alone or in combination of at least two.

Preferably, the nonionic surfactant is a combination of at least two. In the combination of two (a first nonionic surfactant and a second nonionic surfactant), the first nonionic surfactant and the second nonionic surfactant may be the polyether compound, for example, a polyether compound represented by the above-mentioned $R^{11}O-(CH_2CH_2O)_p-(R^{12}O)_q-R^{13}$ [particularly $R^{11}O-(CH_2CH_2O)_p-H$]. A weight ratio of the first nonionic surfactant to the second nonionic surfactant may be 10:90 to 90:10, for example, 20:80 to 80:20, particularly 25:75 to 75:25. Each of the first nonionic surfactant and the second nonionic surfactant may be one alone or a combination of at least two.

(D3) Cationic Surfactant

Preferably, the cationic surfactant is a compound free from an amide group.

Examples of the cationic surfactant include an amine, an amine salt, a quaternary ammonium salt, an imidazoline and an imidazolinium salt.

Preferably, the cationic surfactants are an amine salt, a quaternary ammonium salt and an oxyethylene addition-type ammonium salt. Specific examples of the cationic surfactant, which are not limited, include an amine salt-type surfactants, such as an alkylamine salt, an amino alcohol fatty acid derivative, a polyamine fatty acid derivative and imidazoline; and quaternary ammonium salt-type surfactants, such as an alkyl trimethyl ammonium salt, a dialkyl dimethyl ammonium salt, an alkyl dimethyl benzyl ammonium salt, a pyridinium salt, an alkyl isoquinolinium salt and a benzethonium chloride.

An example of the cationic surfactant is a compound represented by $$R^{21}-N+(-R^{22})(-R^{23})(-R^{24})X^-$$

wherein each of $R^{21}$, $R^{22}$, $R^{23}$ and $R^{24}$ is independently, the same or different, a hydrogen atom, or a hydrocarbon group having 1-50 carbon atoms, and X is an anionic group. The hydrocarbon group may have an oxygen atom, for example, may be an oxyalkylene group (the carbon number of the alkylene is, for example, from 2 to 5.) such as a polyoxyalkylene group. Preferably, $R^{21}$, $R^{22}$, $R^{23}$ and $R^{24}$ each is a hydrocarbon group (for example, an aliphatic hydrocarbon, an aromatic hydrocarbon, or an araliphatic hydrocarbon) having 1-30 carbon atoms.

Specific examples of $R^{21}$, $R^{22}$, $R^{23}$ and $R^{24}$ are an alkyl group (for example, a methyl group, a butyl group, a stearyl group and a palmityl group), an aryl group (for example, a phenyl group), and an aralkyl group (for example, a benzyl group (a phenylmethyl group) and a phenethyl group (a phenylethyl group)).

Examples of X are a halogen (for example, chlorine) and an acid (for example, an inorganic acid such as hydrochloric acid, and an organic acid (particularly a fatty acid) such as acetic acid).

Each of the nonionic surfactant and the cationic surfactant may be used alone or in a combination of at least two.

The amount of the emulsifier (the emulsifier for polymer and the emulsifier for wax) is 0.05 to 20 parts by weight, for example, 0.1 to 10 parts by weight, based on 100 parts by weight of total of the fluorine-free polymer and the wax. The amount of the emulsifier for polymer may be 0.05 to 20 parts by weight, for example, 0.1 to 10 parts by weight, based on 100 parts by weight of the fluorine-free polymer. The amount of the emulsifier for wax may be 0.05 to 20 parts by weight, for example, 0.1 to 10 parts by weight, based on 100 parts by weight of the wax.

(E) Other Ingredients

The surface treatment agent may contain an additive as another ingredient other than the fluorine-free polymer, the wax, the aqueous medium and the emulsifier.

Examples of the additive include a silicon-containing compound and an acrylic emulsion. Other examples of the additive include a drying rate modifier, a crosslinking agent, a film-formation aid, a compatibilizer, a surfactant, an antifreeze agent, a viscosity modifier, a UV absorber, an antioxidant, a pH adjuster, a deforming agent, a feeling modifier, a slip modifier, an antistatic agent, a hydrophilizing agent, an antibacterial agent, a preservative, an insect repellent, a fragrance and a flame retarder.

The amount of the other ingredient may be at most 20% by weight, for example, 0.1 to 10% by weight, based on the surface treatment agent.

The fluorine-free polymer in the present invention can be produced by any of conventional polymerization methods and the polymerization condition can be optionally selected. The polymerization method includes, for example, a solution polymerization, a suspension polymerization and an emulsion polymerization.

In the solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer, and dissolves the monomer, and examples of the organic solvent include an ester (for example, an ester having 2-30 carbon atoms, specifically ethyl acetate and butyl acetate), a ketone (for example, a ketone having 2-30 carbon atoms, specifically methyl ethyl ketone and diisobutyl ketone), and an alcohol (for example, an alcohol having 1-30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In the emulsion polymerization, there can be used a method of emulsifying monomers in water in the presence of a polymerization initiator and an emulsifier, replacing the atmosphere by nitrogen, and copolymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized. As the emulsifier, various emulsifiers such as an anionic emulsifier, a cationic emulsifier and a nonionic emulsifier can be used in the amount within the range from 0.5 to 20 parts by weight based on 100 parts by weight of the monomers. The anionic emulsifier and/or the cationic emulsifier and/or the nonionic emulsifier are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent may be used in the polymerization. The molecular weight of the polymer can be changed according to the amount of the chain transfer agent used. Examples of the chain transfer agent include a mercaptan group-containing compound (particularly alkyl mercaptan (for example, having 1-30 carbon atoms)), such as lauryl mercaptan, thioglycol and thioglycerol, and a mineral salt such as sodium hypophosphite and sodium hydrogen sulfite. The amount of the chain transfer agent may be within the range from 0.01 to 10 parts by weight, for example, from 0.1 to 5 parts by weight, based on 100 parts by weight of total of the monomers.

The treatment agent according to the invention may be in the form of a solution, an emulsion (particularly an aqueous dispersion) or an aerosol, but is preferably an aqueous dispersion. The treatment agent comprises the water- and oil-repellent polymer (the fluorine-free polymer) (an active component of the surface treatment agent) and the medium (particularly an aqueous medium such as an organic solvent and/or water). The amount of medium may, for example, be 5 to 99.9% by weight, particularly 10 to 80% by weight, based on the treatment agent.

In the treatment agent, the concentration of the water- and oil-repellent polymer may be 0.01 to 95% by weight, for example, 5 to 50% by weight.

The treatment agent according to the invention can be applied to a substrate to be treated by a known procedure. Usually, the treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent (for example, a blocked isocyanate), followed by curing. It is also possible to add mothproofing agents, softeners, antimicrobial agents, flame retarders, antistatic agents, paint fixing agents, wrinkle-resistant agents, etc. to the treatment agent. The concentration of the water- and oil-repellent polymer in the treatment liquid contacted with the substrate may be from 0.01 to 10% by weight (particularly for immersion coating), for example, from 0.05 to 10% by weight, based on the treatment liquid.

The substrate to be treated with the treatment agent (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be in any form such as a fiber and a fabric.

The treatment agent of the present invention can be used also as an internal mold release agent or an external mold release agent.

The water- and oil-repellent polymer can be applied to fibrous substrates (such as textiles) by any known method to treat textiles with liquid. When the textile is a cloth, the cloth may be immersed in the solution or the solution may be adhered or sprayed to the cloth. The treated textiles are dried, preferably heated at a temperature between 100° C. and 200° C. in order to develop the oil repellency.

Alternatively, the water- and oil-repellent polymer can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil-repellent. The method of the invention generally also renders the textile hydrophobic and water-repellent.

The fibrous substrate can alternatively be leather. The polymeric product can be applied to leather from aqueous solution or emulsion at various stages of leather processing, for example, during leather wet end processing or during leather finishing, to render the leather hydrophobic and oleophobic.

The fibrous substrate can alternatively be paper. The polymeric product can be applied to preformed paper or at various stages of papermaking, for example, during drying of the paper.

The term "treatment" means that the treatment agent is applied to the substrate by, for example, immersion, spray or coating. The treatment gives the result that the polymer which is an active component of the treatment agent is penetrated into internal parts of the substrate and/or adhered to surfaces of the substrate.

EXAMPLES

The following Examples and Comparative Examples are shown to specifically illustrate the present invention. However, the present invention is not limited to these Examples.

In the following Examples, parts, % and ratio are parts by weight, % by weight and weight ratio, unless otherwise specified.

The procedures of the tests are as follows:

Spray Water Repellency Test

A test solution was prepared by diluting the treatment agent dispersion with tap water so that the solid concentration was 1.5% by weight. A cotton twill cloth was dipped in the test solution, passed through a mangle, and heat treated at 160° C. for 2 minutes. The water repellency of the test cloths was evaluated. The water repellency of the treated cloth was evaluated according to a spray method of JIS-L-1092 (AATCC-22). As shown in Table 1 described below, the water repellency is represented by a water repellency No. The larger the score, the better the water repellency, and in some cases, an intermediate value (95, 85, 75) is allotted.

TABLE 1

| Water repellency No. | State |
| --- | --- |
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Water Leakage Test

A test solution was prepared by diluting the treatment dispersion with tap water so that the solid concentration was 1.5% by weight. A polyester taffeta cloth was dipped in this test solution, passed through a mangle, and heat-treated at 160° C. for 2 minutes to produce a test cloth. According to a Bundesmann test described in JIS-L-1092 (C) method, an amount of water leakage (mL) was measured under rain conditions having a rainfall amount of 80 cc/min., a rainfall water temperature of 20° C., and a rainfall time of 10 minutes.

Mechanical Stability Test

The treatment dispersion was diluted with tap water to a solid concentration of 1% and stirred with a homomixer at 3,000 rpm for 10 minutes. The generated scum was filtered off with a black cotton cloth.

Very Good: No scum generated
Good: Slight scum generated
Fair: Scum generated
Poor: Much scum generated Feeling Test The feeling of the test fabric was evaluated by hand touch.

Very good: Remarkably soft
Good: Soft
Fair: Somewhat hard
Poor: Hard

Chalk Mark Test

A test solution was prepared by diluting the polymer dispersion with tap water so that the solid concentration was 1.5% by weight. A polyester taffeta cloth (gray) was dipped into this test solution and passed through a mangle, and heat-treated at 160° C. for 2 minutes to produce a test cloth. The prepared test cloth was placed on a flat place, a surface of the test cloth was lightly scratched with a nail, and the scratch trace remaining like a chalk was visually evaluated.

Very good: No trace
Good: Thin trace visible
Fair: Trace visible
Bad: Thick trace visible Preparative Example A1

Stearyl acrylate (150 g), pure water (360 g), tripropylene glycol (60 g), polyoxyethylene tridecyl ether (EO3) (HLB 8.0) (7.5 g), polyoxyethylene tridecyl ether (EO20) (HLB 16.3) (12.5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 13.2). Furthermore, the solid content concentration was adjusted to 30% with pure water. The monomer composition in the resulting polymer was almost the same as the monomer feed composition.

Preparative Example A2

Stearyl acrylate (150 g), pure water (360 g), tripropylene glycol (60 g), polyoxyethylene lauryl ether (EO2) (HLB 6.4) (7.5 g), polyoxyethylene lauryl ether (EO20) (HLB 16.5) (12.5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 12.7). Furthermore, the solid content concentration was adjusted to 30% with pure water. The monomer composition in the resulting polymer was almost the same as the monomer feed composition.

Preparative Example A3

Stearyl acrylate (150 g), pure water (360 g), tripropylene glycol (60 g), polyoxyethylene tridecyl ether (EO3) (HLB 8.0) (12.5 g), polyoxyethylene tridecyl ether (EO20) (HLB 16.3) (7.5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 11.1). Furthermore, the solid content concentration was adjusted to 30% with pure water. The monomer composition in the resulting polymer was almost the same as the monomer feed composition.

Preparative Example A4

Stearyl acrylate (150 g), diacetone acrylamide (4 g), pure water (360 g), tripropylene glycol (60 g), sorbitan monostearate (HLB 4.7) (4 g), polyoxyethylene lauryl ether (EO20) (HLB 16.5) (12 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 13.6). Furthermore, the solid content concentration was adjusted to 30% with pure water. The monomer composition in the resulting polymer was almost the same as the monomer feed composition.

Preparative Example A5

Stearyl acrylate (150 g), diacetone acrylamide (4 g), pure water (360 g), tripropylene glycol (60 g), sorbitan monostearate (HLB 4.7) (12 g), polyoxyethylene oleyl ether (EO 50) (HLB 17.8) (5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 8.6). Furthermore, the solid content concentration was adjusted to 30% with pure water. The monomer composition in the resulting polymer was almost the same as the monomer feed composition.

Preparative Example A6

Stearyl acrylate (150 g), diacetone acrylamide (4 g), pure water (360 g), tripropylene glycol (60 g), sorbitan monopalmitate (HLB 6.7) (12 g), polyoxyethylene oleyl ether (EO 50) (HLB 17.8) (5 g), stearyl trimethyl ammonium chloride (1 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 10.0). Furthermore, the solid content concentration was adjusted to 30% with pure water. The monomer composition in the resulting polymer was almost the same as the monomer feed composition.

Preparative Example A7

Stearyl acrylate (150 g), diacetone acrylamide (4 g), pure water (360 g), tripropylene glycol (60 g), sorbitan monostearate (HLB 4.7) (12 g), polyoxyethylene lauryl ether (EO20) (HLB 16.5) (5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 8.2). Furthermore, the solid content concentration was adjusted to 30% with pure water. The monomer composition in the resulting polymer was almost the same as the monomer feed composition.

Preparative Example A8

Stearyl acrylate (150 g), diacetone acrylamide (4 g), pure water (360 g), tripropylene glycol (60 g), sorbitan monolaurate (HLB 8.6) (12 g), polyoxyethylene oleyl ether (EO 50) (HLB 17.8) (5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 11.3). Furthermore, the solid content concentration was adjusted to 30% with pure water. The monomer composition in the resulting polymer was almost the same as the monomer feed composition.

Preparative Example A9

Stearyl acrylate (150 g), diacetone acrylamide (4 g), pure water (360 g), tripropylene glycol (60 g), sorbitan monostearate (HLB 4.7) (12 g), polyoxyethylene oleyl ether (EO 50) (HLB 17.8) (5 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 8.6). Furthermore, the solid content concentration was adjusted to 30% with pure water. The monomer composition in the resulting polymer was almost the same as the monomer feed composition.

Preparative Example A10

Stearyl acrylate (190 g), diacetone acrylamide (4 g), pure water (360 g), tripropylene glycol (60 g), sorbitan monostearate (HLB 4.7) (10 g), polyoxyethylene oleyl ether (EO 50) (HLB 17.8) (7 g), and lauryl mercaptan (1.0 g) were charged in a 1 L autoclave, and ultrasonically emulsified at 60° C. for 15 minutes with stirring. After replacing the inside of the autoclave with nitrogen, 2,2-azobis(2-amidinopropane) dihydrochloride (2.0 g) was added, and the mixture was reacted at 60° C. for 3 hours to obtain an aqueous dispersion of polymer (average HLB: 10.1). Furthermore, the solid content concentration was adjusted to 30% with pure water. The monomer composition in the resulting polymer was almost the same as the monomer feed composition.

Preparative Example A11

Stearyl acrylate (150 g), pure water (360 g), tripropylene glycol (60 g), polyoxyethylene tridecyl ether (EO3) (HLB 8.0) (6 g), polyoxyethylene tridecyl ether (EO20) (HLB 16.3) (13 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 13.7). Furthermore, the solid content concentration was adjusted to 30% with pure water. The monomer composition in the resulting polymer was almost the same as the monomer feed composition.

Preparative Example A12

Stearyl acrylate (150 g), pure water (360 g), tripropylene glycol (60 g), polyoxyethylene lauryl ether (EO20) (HLB 16.5) (19 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 16.5). Furthermore, the solid content concentration was adjusted to 30% with pure water. The monomer composition in the resulting polymer was almost the same as the monomer feed composition.

Preparative Example A13

Stearyl acrylate (150 g), pure water (360 g), tripropylene glycol (60 g), polyoxyethylene tridecyl ether (EO3) (HLB 8.0) (3 g), polyoxyethylene tridecyl ether (EO20) (HLB 16.3) (16 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 15.0). Furthermore, the solid content concentration was adjusted to 30% with pure water. The monomer composition in the resulting polymer was almost the same as the monomer feed composition.

Preparative Example A14

Stearyl acrylate (150 g), diacetone acrylamide (4 g), pure water (360 g), tripropylene glycol (60 g), sorbitan monostearate (HLB 6.5) (14 g), polyoxyethylene lauryl ether (EO20) (HLB 16.5) (3 g), and lauryl mercaptan (1.0 g) were charged in a 1 L autoclave, and ultrasonically emulsified at 60° C. for 15 minutes with stirring. After replacing the inside of the autoclave with nitrogen, vinyl chloride (50 g) was pressure-injected, 2,2-azobis(2-amidinopropane) dihydrochloride (2.0 g) was added, and the mixture was reacted at 60° C. for 3 hours to obtain an aqueous dispersion of polymer (average HLB: 6.8). Furthermore, the solid content concentration was adjusted to 30% with pure water. The monomer composition in the resulting polymer was almost the same as the monomer feed composition.

Preparative Example A15

An aqueous dispersion (average HLB 8.6) of a polymer was obtained in the same manner as in Preparative Example A5, except that lauryl acrylate (150 g) was used instead of stearyl acrylate in the 1 L autoclave. Furthermore, the solid content concentration was adjusted to 30% with pure water. The monomer composition in the resulting polymer was almost the same as the monomer feed composition.

Preparative Example A16

Stearyl acrylate (150 g), diacetone acrylamide (4 g), pure water (360 g), tripropylene glycol (60 g), sorbitan monostearate (HLB 4.7) (17 g), and lauryl mercaptan (1.0 g) were charged in a 1 L autoclave, and ultrasonically emulsified at 60° C. for 15 minutes with stirring. A stable dispersion was not obtained.

Preparative Example B1

Paraffin wax (melting point: 66° C., needle penetration: 12 (25° C.)) (150 g), pure water (350 g), polyoxyethylene oleyl ether (EO7) (HLB 10.7) (8.5 g), and sorbitan monostearate (HLB 4.7) (6.5 g) were charged and sealed in a high pressure reaction vessel, and the temperature was raised to 110-120° C. with stirring, and then high pressure emulsification was carried out under a high pressure for 30 minutes to obtain an aqueous dispersion of wax (average HLB 8.1). Furthermore, a solid content was adjusted with pure water to be 30%.

Preparative Example B2

An aqueous wax dispersion was obtained in the same manner as in Preparative Example B1, except that a paraffin wax (melting point: 68° C., needle penetration: 5 (25° C.)) (150 g) was used in the high pressure reaction vessel. Furthermore, a solid content was adjusted with pure water to be 30%.

Preparative Example B3

An aqueous wax dispersion was obtained in the same manner as in Preparative Example B1, except that a paraffin wax (melting point: 75° C., needle penetration: 6 (25° C.)) (150 g) was used in the high pressure reaction vessel. Furthermore, a solid content was adjusted with pure water to be 30%.

Preparative Example B4

An aqueous wax dispersion was obtained in the same manner as in Preparative Example B1 except that a paraffin wax (melting point: 82° C. needle penetration: 5 (25° C.)) (150 g) was used in the high pressure reaction vessel. Furthermore, a solid content was adjusted with pure water to be 30%.

Preparative Example B5

Paraffin wax (melting point: 75° C., needle penetration: 6 (25° C.)) (150 g), pure water (350 g), polyoxyethylene oleyl ether (EO10) (HLB 12.7) (12 g), and sorbitan monostearate (HLB4.7) (3 g) were charged and sealed in a high pressure reaction vessel, and the temperature was raised to 110-120° C. with stirring, and then high pressure emulsification was carried out under a high pressure for 30 minutes to obtain an aqueous dispersion of wax (average HLB 10.9). Furthermore, a solid content was adjusted with pure water to be 30%.

Preparative Example B6

Paraffin wax (melting point: 75° C., needle penetration: 6 (25° C.)) (150 g), pure water (350 g), polyoxyethylene oleyl ether (EO15) (HLB 14.2) (13.5 g), and sorbitan monostearate (HLB4.7) (1.5 g) were charged and sealed in a high pressure reaction vessel, and the temperature was raised to 110-120° C. with stirring, and then high pressure emulsification was carried out under a high pressure for 30 minutes to obtain an aqueous dispersion of wax (average HLB 13.3). Furthermore, a solid content was adjusted with pure water to be 30%.

Preparative Example B7

An aqueous wax dispersion was obtained in the same manner as in Preparative Example B1, except that a paraffin wax (melting point: 50° C., needle penetration: 22 (25° C.)) (150 g) was used in the high pressure reaction vessel. Furthermore, a solid content was adjusted with pure water to be 30%.

Preparative Example B8

An aqueous wax dispersion was obtained in the same manner as in Preparative Example B1, except that a paraffin wax (melting point: 90° C., needle penetration: 4 (25° C.)) (150 g) was used in the high pressure reaction vessel. Furthermore, a solid content was adjusted with pure water to be 30%.

Preparative Example B9

Paraffin wax (melting point: 75° C., needle penetration: 6 (25° C.)) (150 g), pure water (350 g), polyoxyethylene oleyl ether (EO20) (HLB 15.3) (13.5 g), and sorbitan monostearate (HLB4.7) (1.5 g) were charged and sealed in a high pressure reaction vessel, and the temperature was raised to 110-120° C. with stirring, and then high pressure emulsification was carried out under a high pressure for 30 minutes to obtain an aqueous dispersion of wax (average HLB 14.3). Furthermore, a solid content was adjusted with pure water to be 30%.

Preparative Example B10

Paraffin wax (melting point: 75° C., needle penetration: 6 (25° C.)) (150 g), pure water (350 g), and polyoxyethylene oleyl ether (EO10) (HLB 12.7) (15 g) were charged and sealed in a high pressure reaction vessel, and the temperature was raised to 110-120° C. with stirring, and then high pressure emulsification was carried out under a high pressure for 30 minutes to obtain an aqueous dispersion of wax (average HLB 12.7). Furthermore, a solid content was adjusted with pure water to be 30%.

Preparative Example B11

Paraffin wax (melting point: 75° C., needle penetration: 6 (25° C.)) (150 g), pure water (350 g), and sorbitan monostearate (HLB 4.7) (15 g) were charged and sealed in a high pressure reaction vessel, and the temperature was raised to 110-120° C. with stirring, and then high pressure emulsification was carried out under a high pressure for 30 minutes. A homogeneous aqueous dispersion was not obtained.

Examples 1 to 12 and Comparative Examples 1 to 9

The aqueous dispersion of polymer and the aqueous dispersion of wax obtained in Preparative Examples were mixed to produce an aqueous treatment dispersion (a water- and oil-repellent agent), and the tests were conducted. The results of the tests are shown in Table 2. The "average HLB" in Table 2 is a weighted average HLB of the emulsifiers in the aqueous treatment dispersion (i.e., the emulsifiers in the aqueous dispersion of polymer and the aqueous dispersion of wax).

TABLE 2

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pre. Ex. A1 | 80 | | 50 | 50 | | | | | | | | |
| Pre. Ex. A2 | | 80 | | | | | | | | | | |
| Pre. Ex. A2 | | | | | 50 | | | | | | | |
| Pre. Ex. A4 | | | | | | 70 | | | | | | |
| Pre. Ex. A5 | | | | | | | 70 | | | | | |
| Pre. Ex. A6 | | | | | | | | 70 | | | | |
| Pre. Ex. A7 | | | | | | | | | 70 | | | |
| Pre. Ex. A8 | | | | | | | | | | 70 | | |
| Pre. Ex. A9 | | | | | | | | | | | 70 | |
| Pre. Ex. A10 | | | | | | | | | | | | 70 |

TABLE 2-continued

|  | | | | | | | | | | | | |
|---|---|---|---|---|---|---|---|---|---|---|---|---|
| Pre. Ex. A11 | | | | | | | | | | | | |
| Pre. Ex. A12 | | | | | | | | | | | | |
| Pre. Ex. A13 | | | | | | | | | | | | |
| Pre. Ex. A14 | | | | | | | | | | | | |
| Pre. Ex. A15 | | | | | | | | | | | | |
| Pre Ex. B1 | 20 | | | | | | | | | | | |
| Pre. Ex. B2 | | 20 | | | | | | | | | | |
| Pre. Ex. B3 | | | 50 | | 50 | 30 | 30 | | 30 | 30 | | 30 |
| Pre. Ex. B4 | | | | 50 | | | | | | | | |
| Pre. Ex. B5 | | | | | | | | 30 | | | | |
| Pre. Ex. B6 | | | | | | | | | | | 30 | |
| Pre. Ex. B7 | | | | | | | | | | | | |
| Pre. Ex. B8 | | | | | | | | | | | | |
| Pre. Ex. B9 | | | | | | | | | | | | |
| Pre. Ex. B10 | | | | | | | | | | | | |
| Average HLB | 12.2 | 11.8 | 10.6 | 10.6 | 9.6 | 11.9 | 8.4 | 10.2 | 8.2 | 10.3 | 10.0 | 9.5 |
| Water repellency | 90 | 90 | 90 | 85 | 90 | 90 | 100 | 100 | 100 | 100 | 100 | 90 |
| Water leakage amount (mL) | 15.1 | 15.9 | 18.0 | 19.3 | 17.0 | 9.5 | 8.4 | 14.5 | 17.1 | 10.2 | 11.8 | 18.7 |
| Stability | Good | Good | Good | Good | Good | Good | Very Good | Very Good | Good | Good | Good | Good |
| Feeling | Good | Good | Good | Good | Good | Good | Very Good | Very Good | Very Good | Very Good | Very Good | Very Good |
| Chalk mark | Good | Good | Very Good | Very Good | Very Good | Very Good | Very Good | Very Good | Good | Good | Good | Good |

|  | Comparative Example | | | | | | | | |
|---|---|---|---|---|---|---|---|---|---|
|  | 1 | 2 | 3 | 4 | 5 | 6 | 7 | 8 | 9 |
| Pre. Ex. A1 | | | | | 80 | | 80 | 80 | |
| Pre. Ex. A2 | | | | | | | | | |
| Pre. Ex. A3 | | | | | | | | | |
| Pre. Ex. A4 | | | | | | | | | |
| Pre. Ex. A5 | | | | | | | | | |
| Pre. Ex. A6 | | | | | | | | | |
| Pre. Ex. A7 | | | | | | | | | |
| Pre. Ex. A8 | | | | | | | | | |
| Pre. Ex. A9 | | | | | | | | | |
| Pre. Ex. A10 | | | | | | | | | |
| Pre. Ex. A11 | 100 | | | | | | | | |
| Pre. Ex. A12 | | 70 | | | | | | | |
| Pre. Ex. A13 | | | 80 | | | | | | |
| Pre. Ex. A14 | | | | | | 70 | | | |
| Pre. Ex. A15 | | | | | | | | | 70 |
| Pre. Ex. B1 | | | | | | | | | |
| Pre. Ex. B2 | | | | | | | | | |
| Pre. Ex. B3 | | 100 | 30 | 20 | | 30 | | 30 | |
| Pre. Ex. B4 | | | | | | | | | |
| Pre. Ex. B5 | | | | | | | | | |
| Pre. Ex. B6 | | | | | | | | | |
| Pre. Ex. B7 | | | | | 20 | | | | |
| Pre. Ex. B8 | | | | | | | 20 | | |
| Pre. Ex. B9 | | | | | | | | | 20 |
| Pre. Ex. B10 | | | | | | | | 20 | |
| Average HLB | 13.7 | 8.1 | 14.0 | 13.6 | 12.2 | 7.2 | 12.2 | 12.7 | 10.0 |
| Water repellency | 70 | 0 | 80 | 80 | 70 | 100 | 75 | 80 | 70 |
| Water leakage amount (mL) | 54.2 | 98.0 | 26.3 | 22.9 | 21.2 | 8.2 | 27.6 | 33.5 | 36.5 |
| Stability | Good | Good | Good | Good | Bad | Bad | Good | Very Good | Very Good |
| Feeling | Bad | Very Good | Good | Good | Very Good | Very Good | Fair | Good | Good |
| Chalk mark | Bad | Very Good | Good | Good | Very Good | Very Good | Fair | Good | Good |

INDUSTRIAL AVAILABILITY

The water- and oil-repellent agent of the present invention can be used as a surface treatment agent. The water- and oil-repellent agent of the present invention can also exhibit the functions of an antifouling agent and a soil release agent.

The invention claimed is:

1. A water- and oil-repellent agent which is an aqueous emulsion comprising:
   (A) a fluorine-free polymer having a repeating unit derived from a fluorine-free (meth)acrylate ester monomer,
   (B) a wax having a melting point of 52 to 88° C.,
   (C) an aqueous medium, and
   (D) an emulsifier,
   wherein the fluorine-free (meth)acrylate ester monomer is a compound of the formula:

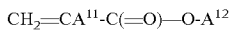

wherein $A^{11}$ is a hydrogen atom or a methyl group, and $A^{12}$ is a linear or branched hydrocarbon group having 18-30 carbon atoms,
   the emulsifier comprises a sorbitan ester and another emulsifier, and the emulsifier has a hydrophilic-lipophilic balance (HLB) of 7.5 to 13.5,
   wherein the another emulsifier is one polyether compound or a mixture of at least two polyether compounds, or is a polyether compound having a polyoxyalkylene group.

2. The water- and oil-repellent agent according to claim 1, wherein $A^{11}$ is a hydrogen atom.

3. The water- and oil-repellent agent according to claim 1, wherein the fluorine-free polymer further has a repeating unit derived from a halogenated olefin.

4. The water- and oil-repellent agent according to claim 1, wherein the wax has a needle penetration of 15 or less.

5. The water- and oil-repellent agent according to claim 1, wherein the wax is a paraffin wax.

6. The water- and oil-repellent agent according to claim 1, wherein the another emulsifier is one polyether compound or a mixture of at least two polyether compounds.

7. The water- and oil-repellent agent according to claim 1, wherein the another emulsifier is a polyether compound having a polyoxyalkylene group.

8. The water- and oil-repellent agent according to claim 7, wherein the polyether compound is at least one selected from:
   a compound represented by the formula:

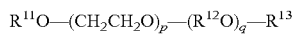

wherein $R^{11}$ is an alkyl group having 1-22 carbon atoms, or an alkenyl group or an acyl group having 2-22 carbon atoms,
   $R^{12}$ each is independently, the same or different, an alkylene group having at least 3 carbon atoms,
   $R^{13}$ is a hydrogen atom, an alkyl group having 1-22 carbon atoms, or an alkenyl group having 2-22 carbon atoms,
   p is a number of at least 2, and
   q is a number of 0 or at least 1, and
   an ester of an alcohol having 3 to 30 carbon atoms with a fatty acid having 5 to 30 carbon atoms, or
   an alkylene oxide adduct of said ester.

9. The water- and oil-repellent agent according to claim 1, wherein the hydrophilic-lipophilic balance (HLB) of the emulsifier is 8 to 12.

10. The water- and oil-repellent agent according to claim 1, wherein a weight ratio of the fluorine-free polymer to the wax is 30/70 to 95/5.

11. The water- and oil-repellent agent according to claim 1, wherein the amount of the fluorine-free polymer is 0.1 to 50% by weight, based on the water- and oil-repellent agent, the amount of the wax is 1 to 200 parts by weight, based on 100 parts by weight of the fluorine-free polymer, the amount of the emulsifier is 0.05 to 20 parts by weight, based on 100 parts by weight of total of the fluorine-free polymer or the wax, and the amount of the aqueous medium is 30 to 99% by weight, based on the water- and oil-repellent agent.

12. The water- and oil-repellent agent according to claim 1, wherein the water- and oil-repellent agent does not contain a fluorine-containing polymer.

13. A method of producing the water- and oil-repellent agent according to claim 1, comprising the steps of:
   (i) polymerizing a monomer comprising a fluorine-free (meth)acrylate ester monomer in the presence of an emulsifier for polymer and an aqueous medium, to obtain an aqueous dispersion of a fluorine-free polymer having a repeating unit derived from the fluorine-free (meth)acrylate ester monomer,
   (ii) dispersing a wax in water in the presence of an emulsifier for wax to obtain an aqueous dispersion of the wax, and
   (iii) mixing the aqueous dispersion of the fluorine-free polymer with the aqueous dispersion of the wax.

14. The method according to claim 13, wherein the hydrophilic-lipophilic balance of the emulsifier for polymer is 8 to 14, and the hydrophilic-lipophilic balance of the emulsifier for wax is 7 to 13.5.

15. A method of producing a treated substrate, comprising applying the water- and oil-repellent agent according to claim 1 to a substrate.

* * * * *